(12) United States Patent
Yamazaki et al.

(10) Patent No.: US 8,040,762 B2
(45) Date of Patent: Oct. 18, 2011

(54) DISK CHANGER DEVICE AND DISK HOLDING METHOD

(75) Inventors: Hidenori Yamazaki, Tokyo (JP); Fumihiko Tsubota, Tokyo (JP)

(73) Assignee: Sony Corporation (JP)

( * ) Notice: Subject to any disclaimer, the term of this patent is extended or adjusted under 35 U.S.C. 154(b) by 364 days.

(21) Appl. No.: 12/386,353

(22) Filed: Apr. 16, 2009

(65) Prior Publication Data

US 2010/0014392 A1    Jan. 21, 2010

(30) Foreign Application Priority Data

Apr. 16, 2008    (JP) ................................ P2008-107073

(51) Int. Cl.
*G11B 7/005* (2006.01)
(52) U.S. Cl. .................................................. 369/30.64
(58) Field of Classification Search ................. 369/30.64
See application file for complete search history.

(56) References Cited

U.S. PATENT DOCUMENTS

| | | | | |
|---|---|---|---|---|
| 4,538,253 A | * | 8/1985 | Ishibashi et al. | 369/30.3 |
| 5,268,889 A | * | 12/1993 | Furukawa et al. | 369/47.22 |
| 5,485,442 A | * | 1/1996 | Furukawa et al. | 369/47.21 |
| 5,841,743 A | * | 11/1998 | Kobayashi et al. | 369/30.3 |
| 5,864,522 A | * | 1/1999 | Sugano et al. | 369/30.29 |
| 7,954,118 B2 | * | 5/2011 | Douglass et al. | 720/621 |
| 2006/0013087 A1 | * | 1/2006 | Miyake et al. | 369/47.11 |

FOREIGN PATENT DOCUMENTS

| JP | 10340516 A | 12/1998 |
|---|---|---|
| JP | 2003-030969 A | 1/2003 |
| JP | 2006040338 A | 2/2006 |
| JP | 2007066498 A | 3/2007 |
| JP | 2008026665 A | 2/2008 |

* cited by examiner

*Primary Examiner* — Huan Hoang
*Assistant Examiner* — Jay Radke
(74) *Attorney, Agent, or Firm* — Lerner, David, Littenberg, Krumholz & Mentlik, LLP

(57) ABSTRACT

A disk changer device including a disk changer mechanism having a drive that can reproduce a disk, a holding mechanism including at least two holding sections, where each of the holding sections can hold the disk, and a picker configured to transfer a disk inserted into the drive to any of the holding sections, a memory configured to store information about the reproduced disk and information about the date and time when the disk is reproduced as reproduction history information when the disk existing in the drive is reproduced, and a control unit configured to determine the position of each of the holding sections where a plurality of the disks held in the holding mechanism is held based on the reproduction history information, and let the disks be held at the determined holding positions is provided.

7 Claims, 6 Drawing Sheets

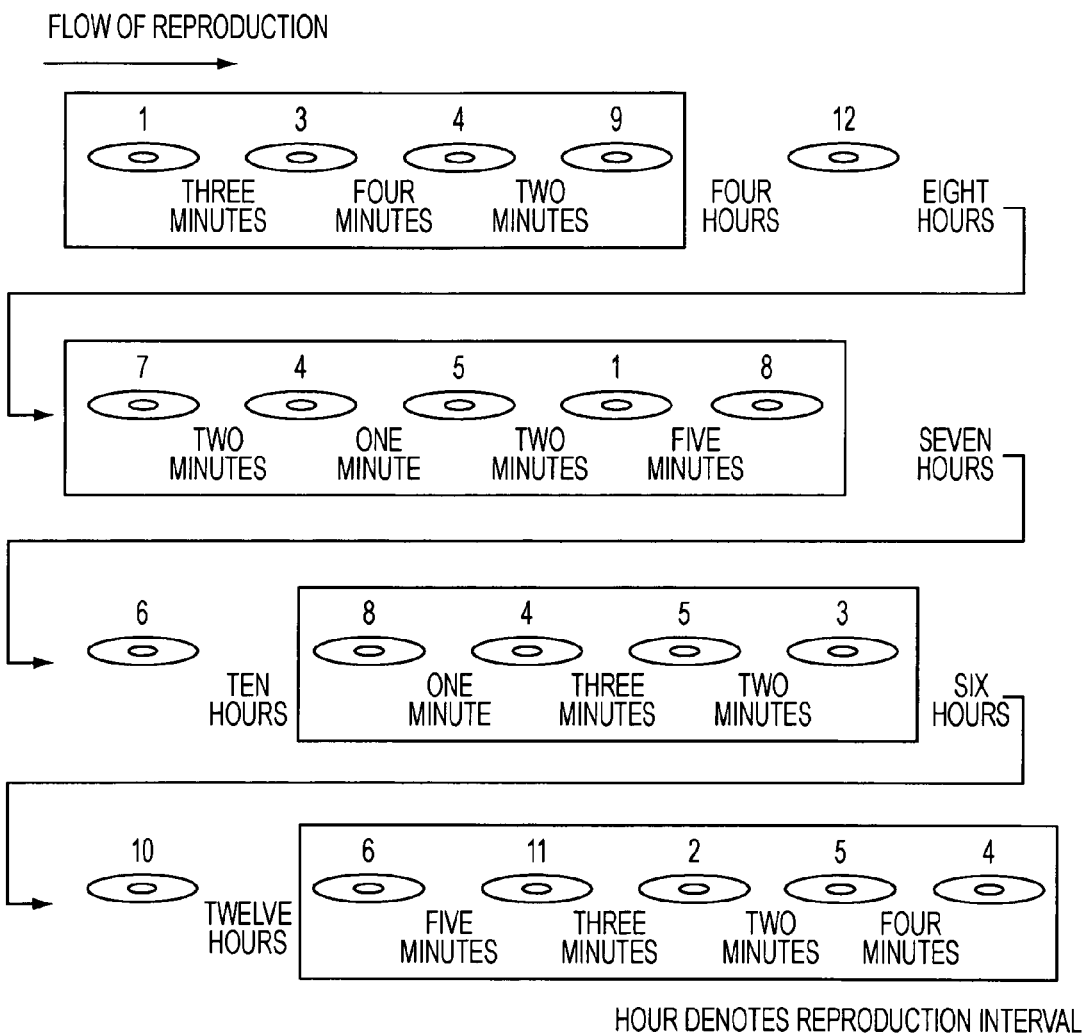

DISK CHANGER DEVICE AND DISK HOLDING METHOD

CROSS-REFERENCE TO RELATED APPLICATIONS

The present application claims priority from Japanese Patent Application No. JP 2008-107073, filed in the Japanese Patent Office on Apr. 16, 2008, the entire content of which is incorporated herein by reference.

BACKGROUND OF THE INVENTION

1. Field of the Invention

The present invention relates to a disk changer device and a disk holding method that allow for holding a plurality of disks.

2. Description of the Related Art

Disk changer devices that can hold a plurality of disks including a compact disk (CD), a digital versatile disk (DVD), "Blu-ray Disc (BD) (Registered Trademark)", and so forth and that can select a desired single disk based on an operation performed by a user have been known.

The above-described disk changer device that can hold the plurality of disks has a configuration that allows for transferring a predetermined disk from a holding section including a plurality of table-shaped objects (hereinafter referred to as disk tables) having at least one section in which the disk is held, the table-shaped objects being stacked on one another, to a drive that can reproduce the disk when the predetermined disk is reproduced. Through the use of the above-described configuration, the disk changer device changes (exchanges) disks, reproduces the disks, records data onto the disks, and so forth.

SUMMARY OF THE INVENTION

When the above-described disk changer device includes a large number of the disk tables stacked on one another, so as to hold many disks, the physical distance between the position where the disk is held and the drive is long. Therefore, it may take a long time until a disk is transferred to the drive in response to a reproduction instruction transmitted from the user and reproduction of the disk is started.

The above-described situation may cause a problem particularly when disks are held in the disk changer device having a large number of holding sections in the order in which the disks are inserted into the disk changer device. When the disks are held in the order in which they are inserted, each of the positions where the disks are sequentially held may become closer to the drive than the previous position is, for example.

If a disk used by the user with a high frequency is accidentally held at the farthest position from the drive in the above-described disk changer device, for example, the disk is transferred over a long distance each time the disk is used, which is inefficient.

For solving the above-described problems, the present invention provides a disk changer device and a disk holding method that allow for holding a disk at an appropriate holding position based on how the disk is used.

For solving the above-described problems, a disk changer device according to an embodiment of the present invention includes a disk changer mechanism having a drive that can reproduce a disk, a holding mechanism including at least two holding sections, where each of the holding sections can hold the disk, and a picker configured to transfer a disk inserted into the drive to any of the holding sections, a memory configured to store information about the reproduced disk and information about the date and time when the disk is reproduced as reproduction history information when the disk existing in the drive is reproduced, and a control unit configured to determine the position of each of the holding sections where a plurality of the disks held in the holding mechanism is held based on the reproduction history information, and let the disks be held at the determined holding positions.

A disk holding method according to another embodiment of the present invention is used for a changer device including a disk changer mechanism having a drive that can reproduce a disk, a holding mechanism including at least two holding sections, where each of the holding sections can hold the disk, and a picker configured to transfer a disk inserted into the drive to any of the holding sections, wherein the disk changer device stores information about the reproduced disk and information about the date and time when the disk is reproduced as reproduction history information when the disk existing in the drive is reproduced, and determines the position of each of the holding sections where a plurality of the disks held in the holding mechanism is held based on the reproduction history information, and lets the disks be held at the determined holding positions.

The present invention, which has been achieved to solve the above-described problems, provides a disk changer device and a disk holding method that allow for holding a disk at an appropriate holding position based on how the disk is used.

BRIEF DESCRIPTION OF THE DRAWINGS

FIG. 6 shows a specific example of reproduction history and specifically illustrates processing procedures performed at steps ST23, ST24, and ST25 that are shown in FIG. 5.

DETAILED DESCRIPTION

Hereinafter, embodiments of the present invention will be described with reference to the attached drawings.

First Embodiment

Figure 1:
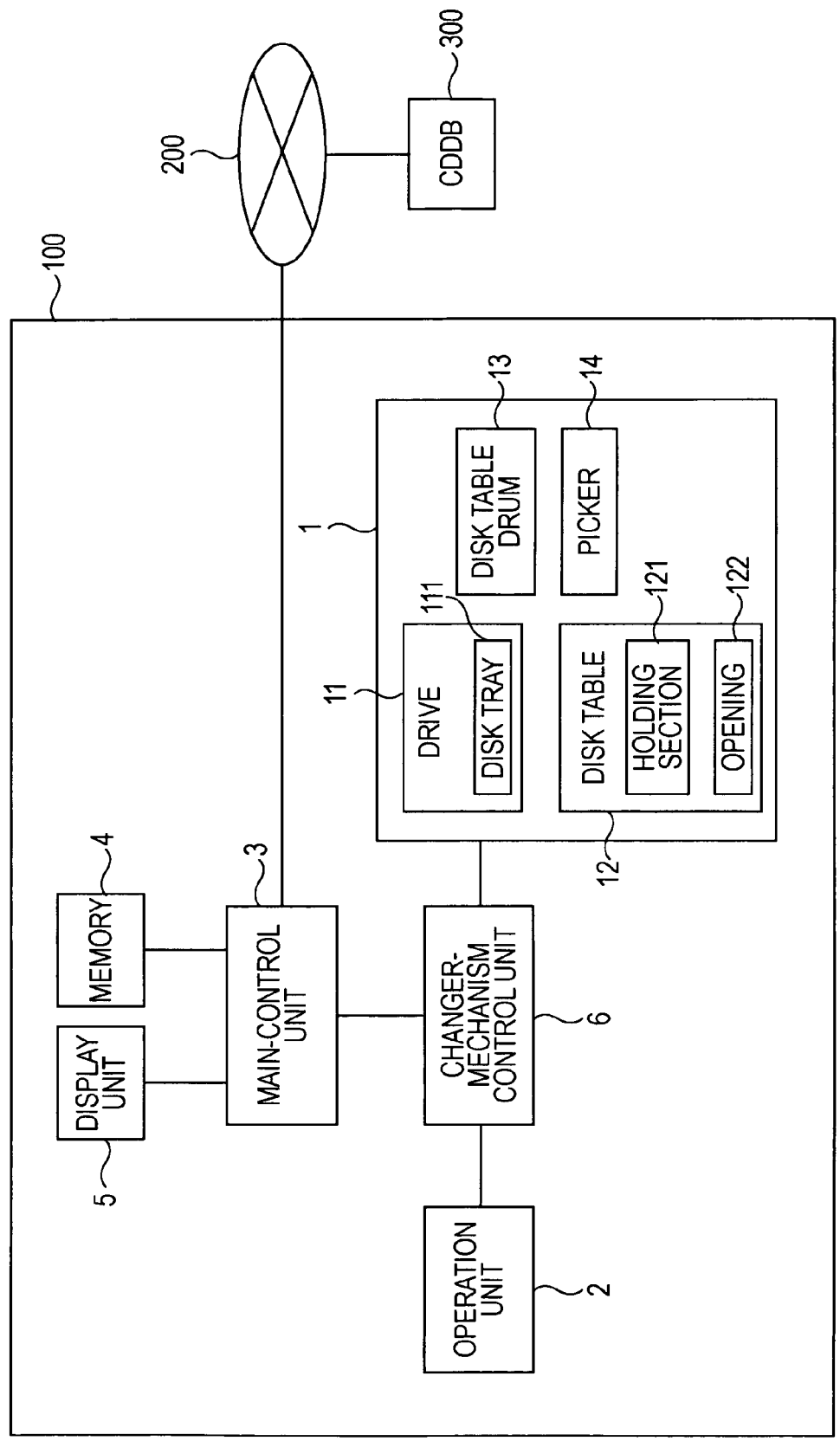
FIG. 1 is a block diagram showing an exemplary configuration of a disk changer device according to an embodiment of the present invention.

FIG. 1 is a block diagram showing an exemplary configuration of a disk changer device 100 according to a first embodiment of the present invention.

As shown in FIG. 1, the disk changer device 100 includes a disk changer mechanism 1 (corresponding to a disk changer mechanism according to an embodiment of the present invention), an operation unit 2, a main control unit 3 (corresponding to a control unit according to an embodiment of the present invention), a memory 4 (corresponding to a memory according to an embodiment of the present invention), a display unit 5, and a changer-mechanism control unit 6.

The configuration of the disk changer mechanism 1 will be described.

Figure 2:
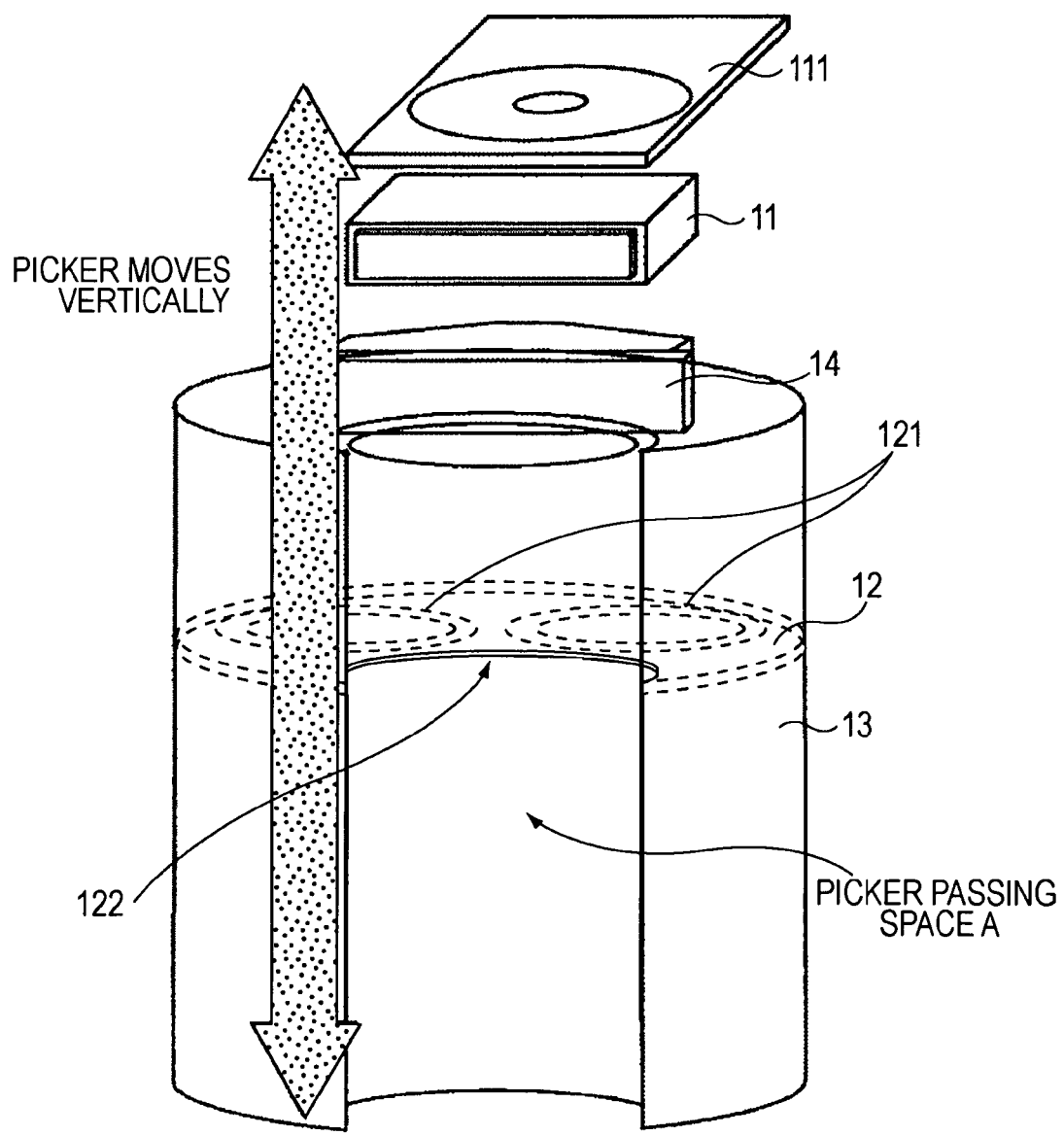
FIG. 2 shows an exemplary configuration of a disk changer mechanism.

FIG. 2 shows an exemplary configuration of the disk changer mechanism 1.

As shown in FIG. 2, the disk changer mechanism 1 includes a drive 11 (corresponding to a drive according to an embodiment of the present invention), a plurality of disk tables 12, a disk table drum 13, and a picker 14.

The drive 11 is an optical drive configured to rotate a disk with high speed and read data recorded onto the disk through laser light emitted from an optical pickup. The drive 11 includes a disk tray 111 into and/or from which a disk is inserted and/or ejected. When inserting and/or ejecting the disk, the disk tray 111 is exposed outside the drive 11 so that the disk can be inserted and/or ejected into and/or from the disk tray 111.

The disk tables 12 are housed in the disk table drum 13 which will be described later. Each of the disk tables 12 is a disk-shaped member provided to hold a disk. Each of the disk tables 12 is perforated with at least two holes (two holes in the above-described embodiment) as holding sections 121. Each of the holding sections 121 is formed so that a disk can be placed and held thereon. The disk tables 121 are housed in the disk table drum 13 in a vertical direction. Although the number of the disk tables 12 is not limited in the above-described embodiment, the number may be one hundred to one hundred and fifty, for example, so that two hundred to three hundred disks can be held on the disk tables 12. Further, in the above-described embodiment, all of the disk tables 12 are collectively referred to as a holding mechanism (corresponding to a holding mechanism according to an embodiment of the present invention) as a configuration provided to hold disks.

The disk table 12 is provided with an opening 122 through which the picker 14 which will be described later passes, so that a disk is transferred from the drive 11 to each of the holding sections 121, or disks are transferred from the holding sections 121 to the drive 11. Since the disk tables 12 are stacked on one another in a vertical direction, the opening 122 of each of the disk tables 12 forms picker passing space A shown in FIG. 2, for example.

The disk table drum 13 is a cylindrical case configured to accommodate the above-described disk tables 12 stacked on one another in the vertical direction (the holding mechanism). Further, as shown in FIG. 2, the disk table drum 13 has the opening corresponding to the picker-passing space A of the disk table 12, so as not to interfere with the picker 14 moving in the vertical direction.

The picker 14 is a part of a transfer mechanism provided to transfer the disk inserted into the disk tray 111 of the drive 11 to an appropriate holding section 121 so that the disk is held thereon and has a tray-like shape so that the disk can be transferred by the picker 14. The picker 14 moves in the vertical direction within the picker-passing space A shown in FIG. 2, so as to transfer the disk inserted into the drive 11 to any of the holding sections 121 or transfer the disk from any of the holding sections 121 to the drive 11. To which of the holding sections 121 the picker 14 transfers the disk and/or from which of the holding sections 121 the picker 14 extracts the disk is determined under the control of the changer-mechanism control unit 6 which will be described later.

The operation unit 2 is an operation device including buttons, keys, and so forth that are provided to accept information about an operation performed by a user for the disk changer device 100. The operation unit 2 includes, for example, an open/close key provided to open and/or close the disk tray 111 of the drive 11, a reproduction key provided to reproduce a disk when the disk is mounted into the drive 11, a record key provided to write data onto the disk mounted into the drive 1, an end key provided to end operations of the disk changer device 100, a selection key provided to perform selection operations, and so forth.

The main control unit 3 is a control section configured to have centralized control over the operations of the disk changer device 100. Namely, the main control unit 3 executes various operations of the disk changer device 100 based on operations performed by the user for the operation unit 2, for example. Particularly, the main control unit 3 instructs the changer-mechanism control unit 6 to control the operations of the disk changer mechanism 1 based on the operations performed by the user for the operation unit 2, for example.

Further, the main control unit 3 is connected to a network 200 (the Internet, an intranet, and so forth), so as to make the drive 11 of the disk changer mechanism 1 read table-of-contents (TOC) information that had already been written onto the disk, obtain various kinds of information about the disk by accessing a search service unit generated based on the TOC information obtained on the network 200, such as a compact disk data base (CDDB) 300, and make the memory 4 store the obtained various information. The various kinds of information about the disk denotes information about the title (name) of the disk, the titles of recorded contents, players, performers, the writers of lyrics, composers, the release date, and so forth.

The memory 4 is connected to the main control unit 3, for example, and stores the various kinds of information about various operations of the disk changer device 100. The memory 4 is provided as a nonvolatile memory including an electrically erasable and programmable read only memory (EEPROM), a hard disk drive (HDD), and so forth.

The display unit 5 is a display device including a liquid crystal display (LCD), an organic electroluminescence (EL) display device, and so forth. The display unit 5 performs various kinds of display operations under the control of the main control unit 3. For example, the display unit 5 can display a guide message, so as to make the user select a desired disk from among at least two disks held in the holding sections 121 of the disk changer mechanism 1.

The changer-mechanism control unit 6 controls the operations of the disk changer mechanism 1 in accordance with an instruction transmitted from the main control unit 3.

Hereinafter, exemplary operations will be described, where the exemplary operations are performed when the user inserts a disk into the disk changer device 100 of the above-described first embodiment and the disk is held in the holding section 121 of the disk changer mechanism 1.

Figure 3:
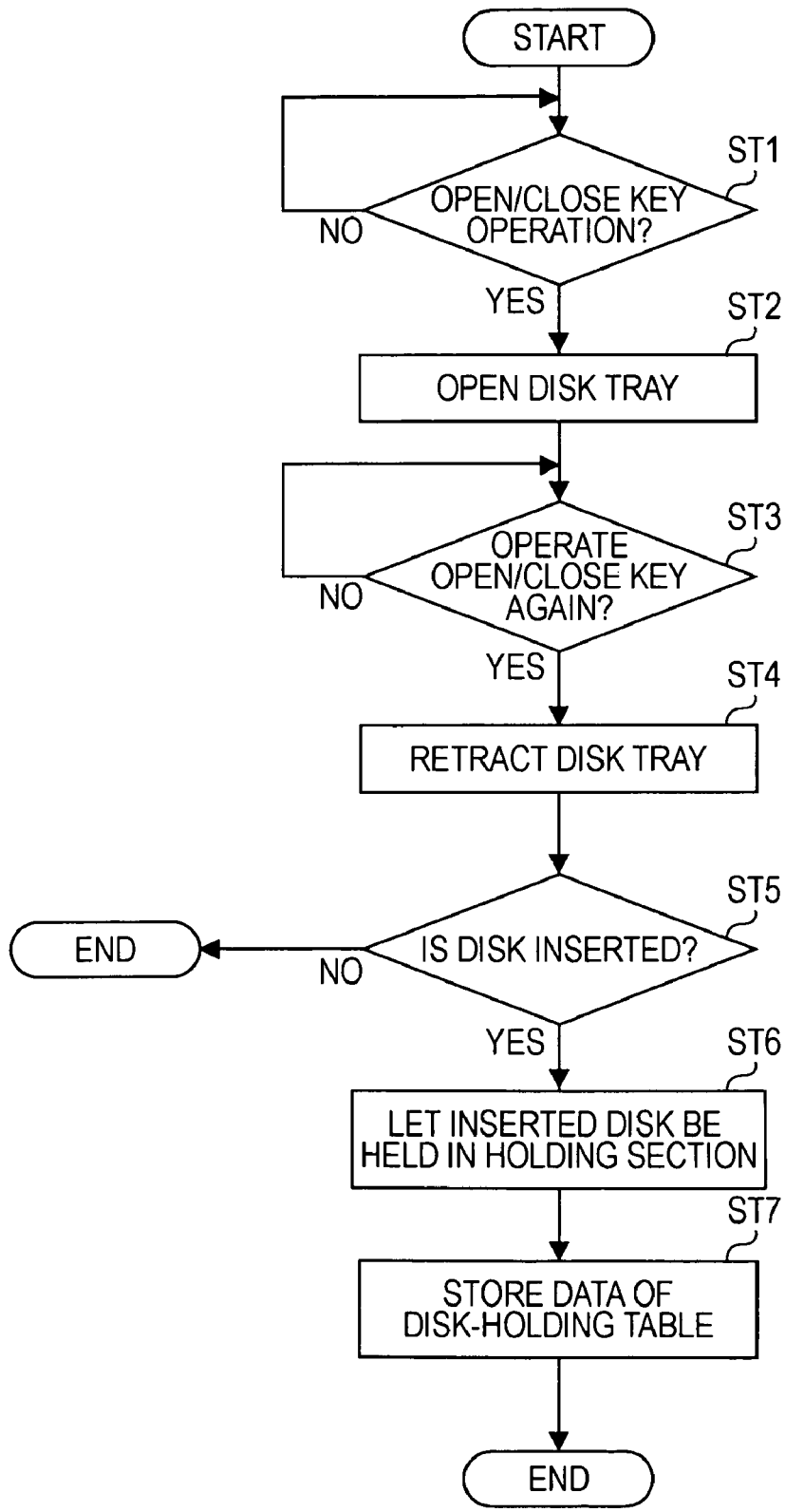
FIG. 3 is a flowchart provided to illustrate exemplary operations performed when a user inserts a disk into the disk changer device and the disk is held in a holding section of the disk changer mechanism.

FIG. 3 is a flowchart provided to illustrate the above-described exemplary operations.

Step ST1:

The main control unit 3 determines whether the open/close key of the operation unit 2 is operated. If it is determined that the open/close key is operated, the processing advances to step ST2. Otherwise, the processing corresponding to step ST1 is performed again.

Step ST2:

The main control unit 3 opens the disk tray 111 of the drive 11 of the disk changer mechanism 1 based on an operation performed for the open/close key at step ST1.

Step ST3:

The main control unit 3 determines whether the open/close key of the operation unit 2 is operated again. If it is determined that the open/close key is operated again, the processing advances to step ST4. Otherwise, the processing corresponding to step ST3 is performed again.

Step ST4:

The main control unit 3 retracts the disk tray 111 of the disk changer mechanism 1 based on the operation performed for the open/close key at step ST3.

Step ST5:

The main control unit 3 determines whether a disk is inserted into the drive 11 before the disk tray 111 opened at step ST2 is retracted at step ST4. If it is determined that the disk is inserted, the processing advances to step ST6. Otherwise, the processing is terminated.

Step ST6:

The changer-mechanism control unit 6 makes the holding section 121 hold the disk inserted into the drive 11 between steps ST2 and ST4 under the control of the main control unit 3 by controlling each part of the disk changer mechanism 1.

Further, which of the holding sections 121 should hold the disk inserted into the drive 11 is determined by the main control unit 3 at step ST6. A method used by the main control unit 3, so as to make the above-described determination, will be described later in detail.

Step ST7:

The main control unit 3 makes the memory 4 store data of the position of the holding section 121 where the disk is held through the changer-mechanism control unit 6 at step ST6.

For example, the memory 4 stores information about in which of the holding sections 121 each of the disks that are held in the holding sections 121 is held, as data of a table. Hereinafter, the above-described table is exemplarily referred to as a disk-holding table T. The disk-holding table T shows items of information about the disks and those of information about the numbers of the holding sections 121 in which the disks are held in association with one another.

Here, the information about the disk shows the titles, performers, genres, and so forth of contents recorded onto the disk. The main control unit 3 can obtain the above-described disk information by accessing a database via the network 200 including the Internet or the like based on the TOC information that had already been written onto the disk, for example. The above-described database includes the CDDB, for example.

The numbers of the holding units 121 in which the disks are held are determined as below. For example, if the total number of the holding sections 121 is determined to be N (where N denotes a positive integer), for example, the left-side holding section 121 of the topmost disk table 12 is determined to the first holding unit, and the number of the right-side holding section 121 of the lowermost disk table 12 is determined to be N. Thus, all of the holding sections 121 are sequentially assigned numbers.

As described above, a disk inserted into the disk tray 111 of the drive 11 provided in the disk changer mechanism 1 is stored in any of the holding sections 121. Further, information about the disk holding table T showing information about the disk and the number of the holding section 121 in which the disk is held in association with one another is stored in the memory 4. Therefore, which disk is held in which holding section can be readily understood.

Next, exemplary operations performed by the disk changer device 100 when the held disk is reproduced will be described.

Figure 4:
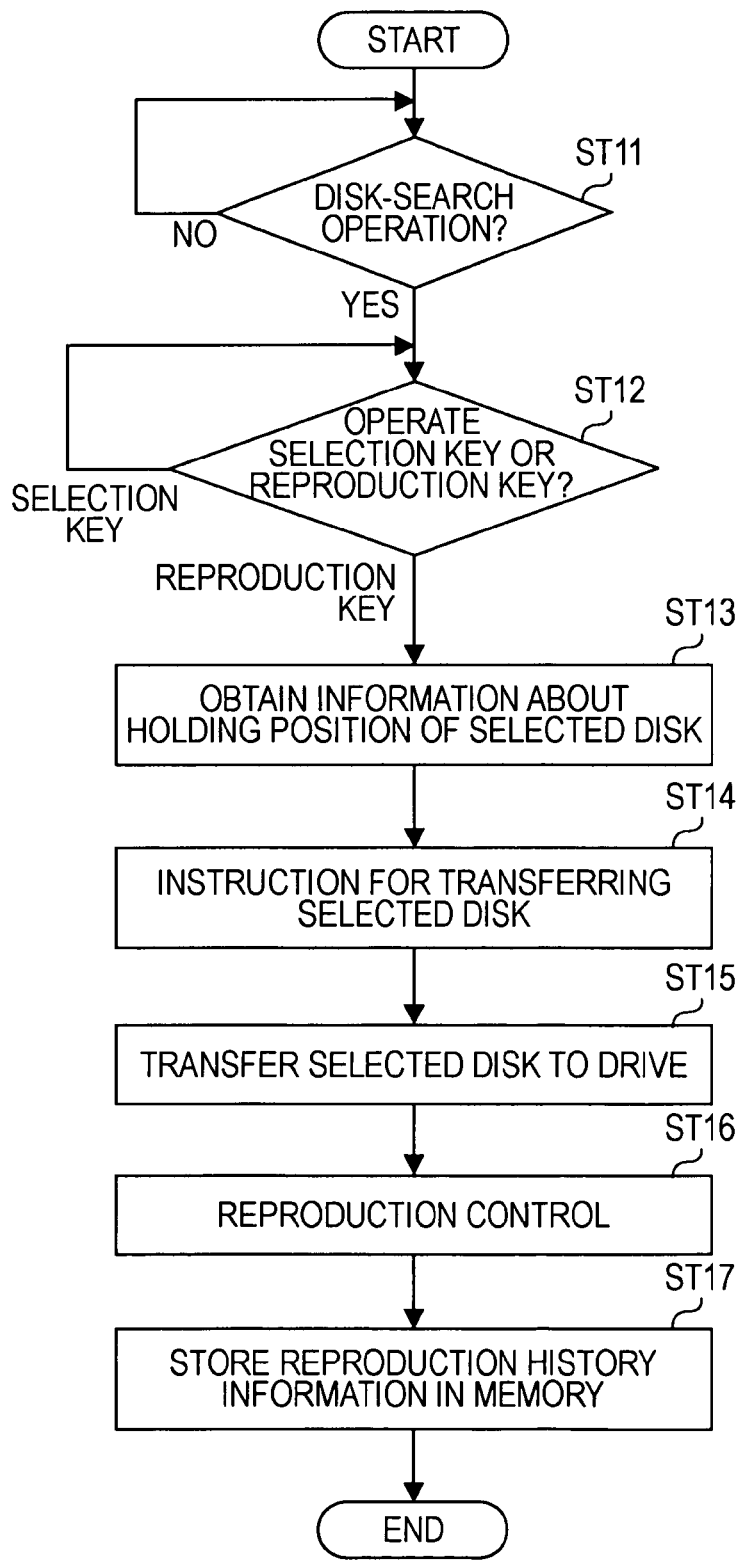
FIG. 4 is a flowchart provided to illustrate exemplary operations performed by the disk changer device when the held disk is reproduced.

FIG. 4 is a flowchart showing the above-described exemplary operations.

Step ST11:

The main control unit 3 makes the display unit 5 display the information about the disk held in the holding section 121 of the disk changer mechanism 1. Consequently, the user can select a disk for reproduction.

Step ST12:

The main control unit 3 determines whether the selection key of the operation section 2 is selected and/or whether the reproduction key of the operation section 2 is selected. If it is determined that the selection key is operated, the processing corresponding to step ST12 is performed again. If it is determined that the reproduction key is operated, the processing advances to step ST13.

Step ST13:

The main control unit 3 obtains information indicating in which of the holding sections 121 the disk selected for reproduction at step ST12 is held by referring to the disk-holding table T of the memory 4.

Step ST14:

The main control unit 3 instructs the changer-mechanism control unit 6 to transfer the disk selected for reproduction at step ST12 to drive 11 based on the information indicating in which of the holding sections 121 the above-described disk is held, the information being obtained at step ST13.

Step ST15:

The changer-mechanism control unit 6 controls and makes the picker 14 transfer the disk selected for reproduction to the drive 11.

Step ST16:

The main control unit 3 performs control so that the disk mounted into the drive 11 is reproduced.

Step ST17:

The main control unit 3 makes the memory 4 store information about reproduction of the disk, the information being obtained at the above-described step.

Each time the disk is reproduced in the drive 11 provided in the disk changer device 100, the memory 4 stores information about the reproduced disk and information about the date and time when the disk is reproduced, as reproduction history information. The reproduction history information includes information about the disk (e.g., the titles of contents of the disk), the date and time when the disk is reproduced, and the cumulative total of the number of times the disk is reproduced. Namely, each time the disk is reproduced, the main control unit 3 increments the cumulative total of the number of times the disk is reproduced by one and updates the reproduction history information.

As described above, the disk changer device 100 of the above-described embodiment stores the reproduced-disk information and the reproduction-date information in the memory 4 as the reproduction history information each time the disk is reproduced by the user. Therefore, the disk changer device 100 can readily determine which of the disks is reproduced with which frequency.

When determining the position where the disk is held, the above-described disk changer device 100 can determine the holding position in consideration of the date and time when the disk is reproduced and the reproduction frequency.

Further, according to the disk changer device 100 of the above-described embodiment, a least two disks reproduced at short intervals can be collectively held at positions close to each other based on the reproduction history information stored in the memory 4. Further, disks belonging to a group that had already been registered can be collectively held at positions close to each other based on information about the group. In the above-described embodiment, the group contains a disk recording a series of contents, a disk recording contents of the same genre, and so forth. The disks belonging to the above-described group may be registered in advance by the user, or disks recording contents of the same genre may be registered so that such disks automatically belong to the same group based on genre information acquired from the network 200 through the main control unit 3. Information about the disks registered with the group is stored in the memory 4 in advance as the group information.

Hereinafter, an exemplary method of determining the position where a disk is held, the method being used in the disk changer device 100 of the above-described embodiment, will be described.

Figure 5:
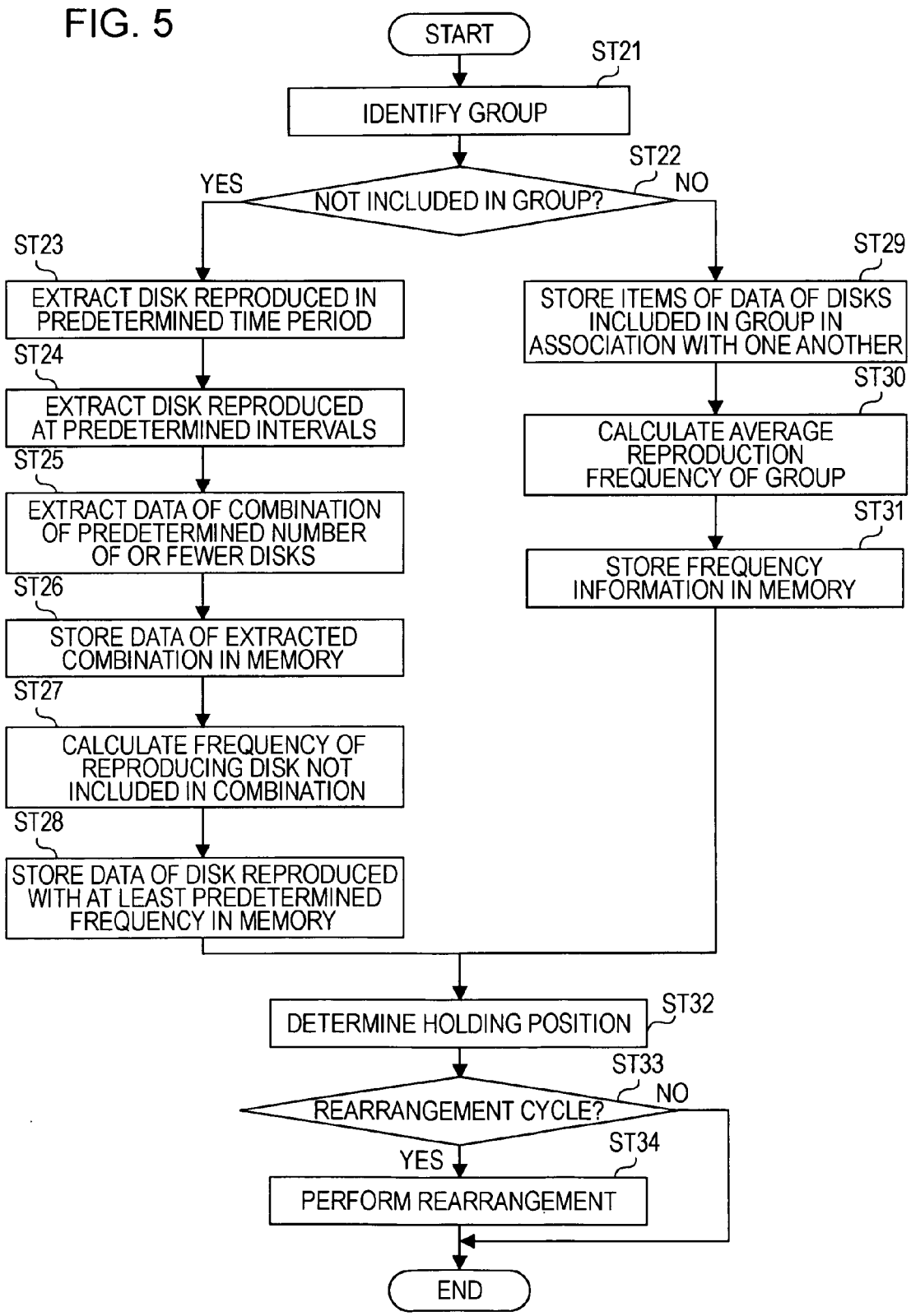
FIG. 5 is a flowchart provided to illustrate an exemplary method of determining the holding position of a disk in the disk changer device.

FIG. 5 is a flowchart illustrating the above-described exemplary method.

Step ST21:

For all of the disks held in the holding sections 121, the main control unit 3 discriminates between disks belonging to a predetermined group and disks that do not belong to the predetermined group based on the group information registered with the memory 4 in advance.

Step ST22:

The processing advances to step ST23 for the disks that do not belong to the predetermined group. For the disks belonging to the predetermined group, the processing advances to step ST29.

Step ST23:

The main control unit 3 extracts data of disks reproduced during a predetermined time period. The predetermined time period denotes a preset time period, such as n days or fewer (n denotes a positive integer).

Step ST24:

The main control unit 3 further extracts data of a disk reproduced at predetermined intervals from among the disks of which data is extracted at step ST23. The predetermined intervals denotes preset intervals, such as intervals of m minutes or fewer (m denotes another positive integer).

Step ST25:

The main control unit 3 extracts a combination of a predetermined number of or fewer disks from among the disks extracted at step ST24.

The processing procedures corresponding to steps ST23 to ST25 will be specifically described.

FIG. 6 is a diagram that shows a specific example of the reproduction history and that specifically illustrates the processing procedures corresponding to steps ST23 to ST25.

According to the example shown in FIG. 6, twelve disks 1, 2, 3, 4, 5, 6, 7, 8, 9, 10, 11, and 12 are reproduced in the last two days (forty-eight hours). Namely, the predetermined intervals are determined to be two days and a result of which data is extracted at step ST23 is shown.

Here, if the predetermined intervals are determined to be five minutes and data of disks reproduced within five minutes is extracted, data of a set of disks enclosed with a square, as shown in FIG. 6, is extracted. The above-described extraction corresponds to the processing performed at step ST24. Hereinafter, the set of disks reproduced at the predetermined time intervals or shorter time intervals, where the data of the disks is extracted, will be referred to as the disk set.

Data of a combination of three or fewer disks is extracted from data of the disk sets enclosed with the squares. The combination denotes a combination of reproduced disks existing in the disk sets. Of all combinations existing in the same disk set, data of combinations which appear at least two times is extracted irrespective of the order in which the combinations appear.

The following example is based on the example shown in FIG. 6. Namely, the predetermined disk number is determined to be three and a combination which appears at least two times is extracted from among four extracted disk sets. Namely, in the example shown in FIG. 6, a combination of the disks 4 and 5 (hereinafter, a combination is expressed as a combination of the disks 4-5) is extracted three times, a combination of the disks 1-4 is extracted two times, a combination of the disks 3-4 is extracted two times, a combination of the disks 4-8 is extracted two times, a combination of the disks 5-8 is extracted two times, and a combination of the disks 4-5-8 is extracted two times.

Thus, data of the combinations of the disks reproduced at short reproduction intervals is extracted. Therefore, at least two items of the above-described data can be stored in association with each other.

Step ST26:

The main control unit 3 stores the combination data extracted at step ST24 in the memory 4.

Step ST27:

Of all the disks reproduced within a predetermined time period, where data of the disks are extracted at step ST23, the main control unit 3 generates reproduction frequency information relating to the reproduction frequency for disks that do not belong to the combination of which data is extracted at step ST24 based on the reproduction history of which data is stored in the memory 4.

Step ST28:

The main control unit 3 extracts data of disks reproduced at least a predetermined number of times from among the disks for which the reproduction frequency information is generated at step ST27 and stores the extracted disk data in the memory 4.

By performing the above-described processing procedures corresponding to steps ST26 to ST28, data of disks reproduced with a high frequency is extracted. Accordingly, it becomes possible to store information about a disk which has recently been reproduced with a high frequency.

Step ST29:

If a disk is determined to be a disk belonging to the group registered in advance at step ST22, the main control unit 3 stores information about the disk in the memory 4 in association with information about other disks belonging to the same group.

Step ST30:

The main control unit 3 calculates the reproduction frequency for each group. Namely, for example, the main control unit 3 calculates the reproduction frequency information about each of the disks belonging to each group, calculates the average of each group, and determines the average to be the reproduction frequency of the entire group.

Step ST31:

The main control unit 3 stores data of the reproduction frequency calculated at step ST30 in the memory 4.

By performing the processing procedures corresponding to steps ST29 to ST31, a disk belonging to the group registered in advance is associated with other disks belonging to the registered group. Further, information about the reproduction frequency of at least two groups is stored in the memory 4.

Step ST32:

The main control unit 3 determines the holding position of each of the disks held in the holding sections 121 based on each information stored in the memory 4 during the processing procedures corresponding to steps ST23 to ST31 that have been described.

That is to say, the main control unit 3 determines the holding positions so that the combined disks are held at holding positions close to each other based on the combinations of the disks, where data of the combinations is extracted during the processing procedures corresponding to steps ST23 to ST25.

Further, the main control unit 3 determines the holding positions for disks that do not belong to the combinations, where the data of the disks is extracted during the processing procedures corresponding to steps ST26 to ST28. Namely, the disks are held at holding positions, where each of the holding positions is closer to the drive 11 than the previous position is, in descending order of the reproduction frequency.

Further, for each of the groups for which the reproduction frequency information is generated during the processing procedures corresponding to steps ST29 to ST31, the main control unit 3 determines the holding positions as below. Namely, the disks of each group are held in holding positions close to each other. Further, as the reproduction frequency of the group grows, the holding positions of the disks belonging to the group become closer to the drive 11.

The main control unit 3 uniquely determines the holding position of each of the disks held in the holding sections 121 based on the above-described determining methods, and stores information about the determined holding positions in the memory 4 as rearrangement information.

Step ST33:

The main control unit 3 determines whether the disks should have been rearranged on a predetermined rearrangement cycle. The predetermined rearrangement cycle denotes a cycle set in advance, so as to rearrange the disks held in the holding sections 121. Namely, according to the disk changer device 100 of the above-described embodiment, rearrangement is executed on a predetermined cycle so that the disks held in the holding sections 121 are held at the holding positions determined at step ST32.

The holding positions determined at step ST32 are appropriate for the use frequencies of the disks. Therefore, when the disk is reproduced next time, the picker 14 may transfer the disk with efficiency. Here, the rearrangement cycle may be set during a time of day when the user does not use the disk changer device 100 every day (e.g., four o'clock in the midnight), or each time the disk is reproduced, for example.

If it is determined that the disks should have been rearranged on the rearrangement cycle, the processing advances to step ST34. Otherwise, the processing is terminated.

Step ST34:

The main control unit 3 controls each part of the disk changer mechanism 1 via the changer-mechanism control unit 6 so that the disks are held at the holding positions determined at step ST32. Further, the main control unit 3 updates the disk holding table T of each disk based on the holding positions determined after the rearrangement is performed.

Thus, according to the disk changer device 100 of the above-described embodiment, the reproduction history information is stored at the time when the disk held in the holding section 121 is reproduced. Then, a holding position appropriate for each disk is determined as occasion arises based on the above-described reproduction history information. Consequently, the holding position of each of the disks held in the holding sections 121 is appropriately adjusted so that the picker 14 can transfer the disks with increased efficiency when the disks are reproduced next time, for example.

The holding position may be determined according to the following method. Namely, data of a combination of a predetermined number of or fewer disks is extracted from data of disks reproduced at predetermined intervals within a predetermined time period. Then, the combined disks are held at holding positions close to each other based on the extracted combination data.

In another case, the holding positions of the disks that do not belong to the combination of the disks reproduced at the predetermined intervals within the predetermined time period may be determined so that the holding position where each of the disks that do not belong to the combination is held becomes closer to the drive 11 as the reproduction frequency of the disk grows.

In another case, the reproduction frequency information may be generated for each of disks belonging to a group set in advance based on the reproduction history information, and the disks may be held at holding positions close to each other for each group. Further, the holding positions may be determined so that the holding positions where the disks of the group are held become closer to the drive 11 as the reproduction frequency of the group grows.

Through the use of the above-described disk changer device 100, the holding positions of the disks held in the holding sections 121 are rearranged in consideration of the preference of the user, for example. Consequently, the picker 14 can transfer the disks with increased efficiency when the disks are reproduced next time. Further, since the distance traveled by the picker 14 during the disk reproduction is decreased, the life of the disk changer mechanism 1 may be increased.

The present invention can be achieved without being limited to the above-described embodiments. Namely, the components of the above-described embodiments may be modified and/or replaced with other components in various ways without leaving the technical scope of the present invention and a scope equivalent thereto.

In the above-described embodiment, the holding positions are determined based on the information extracted during the processing procedures corresponding to steps ST23 to ST31 that are shown in the flowchart of FIG. 5. However, without being limited to the above-described embodiments, parameters or the like may be freely set and the holding positions may be determined based on the set parameters, which constitutes another embodiment of the present invention.

Further, the time of determining the holding position of the disk held in the holding section 121 is not particularly limited. For example, the processing procedures shown in the flow-chart of FIG. 5 may be performed, the processing procedures being performed to determine the holding position of each of the disks, when the reproduction of a certain disk is finished. Further, the holding positions may be automatically rearranged on a predetermined cycle, as is the case with the rearrangement processing.

It should be understood by those skilled in the art that various modifications, combinations, sub-combinations and alterations may occur depending on design requirements and other factors insofar as they are within the scope of the appended claims or the equivalents thereof.

What is claimed is:
1. A disk changer device comprising:
a disk changer mechanism including
a drive that can reproduce a disk,
a holding mechanism including at least two holding sections, where each of the holding sections can hold the disk, and
a picker configured to transfer a disk inserted into the drive to any of the holding sections;
a memory configured to store information about the reproduced disk and information about a date and time at which the disk is reproduced as reproduction history information when the disk existing in the drive is reproduced; and a control unit configured to determine a position of each of the holding sections where a plurality of the disks held in the holding mechanism is held based on the reproduction history information, and let the disks be held at the determined holding positions.

2. The disk changer device according to claim 1, wherein the control unit extracts data of a disk reproduced within a predetermined time period from among all of the disks that are held in the holding mechanism based on the reproduction history information, extracts data of a disk reproduced at predetermined intervals from the extracted disk data, extracts data of a combination of a predetermined number of or fewer disks, and makes a determination so that the disks belonging to the combination are held in holding sections close to each other based on the combination data.

3. The disk changer device according to claim 1, wherein the control unit calculates a reproduction frequency of each of the disks held in the holding mechanism based on the reproduction history information, and determines that a holding section where a disk is held becomes closer to the drive as a reproduction frequency of the disk increases based on the calculated reproduction frequency.

4. The disk changer device according to claim 1, wherein the control unit extracts data of disks belonging to a preset group and determines that disks belonging to the same group are held in holding sections close to each other.

5. The disk changer device according to claim 4,
wherein the control unit extracts the data of the disks belonging to the preset group,
wherein, for at least two groups, the control unit compares averages of reproduction frequencies of the disks belonging to the groups to each other based on the reproduction history information stored in the memory, and
wherein the control unit determines that holding sections where the disks are held become closer to the drive as the reproduction frequency average of the group increases.

6. A disk holding method used for a changer device, wherein the changer device comprises a disk changer mechanism including a drive that can reproduce a disk, a holding mechanism including at least two holding sections, where each of the holding sections can hold the disk, and a picker configured to transfer a disk inserted into the drive to any of the holding sections, the method comprising:

storing information about the reproduced disk and information about a date and time at which the disk is reproduced as reproduction history information when the disk existing in the drive is reproduced; and determining a position of each of the holding sections where a plurality of the disks held in the holding mechanism is held based on the reproduction history information, and holding the disks at the determined holding positions.

7. The disk holding method according to claim 6, wherein data of a disk reproduced within a predetermined time period is extracted from among all of the disks that are held in the holding mechanism based on the reproduction history information, data of a disk reproduced at predetermined intervals is extracted from the extracted disk data, data of a combination of a predetermined number of or fewer disks is extracted, and a determination is made so that the disks belonging to the combination are held in holding sections close to each other based on the combination data.

* * * * *